UNITED STATES PATENT OFFICE.

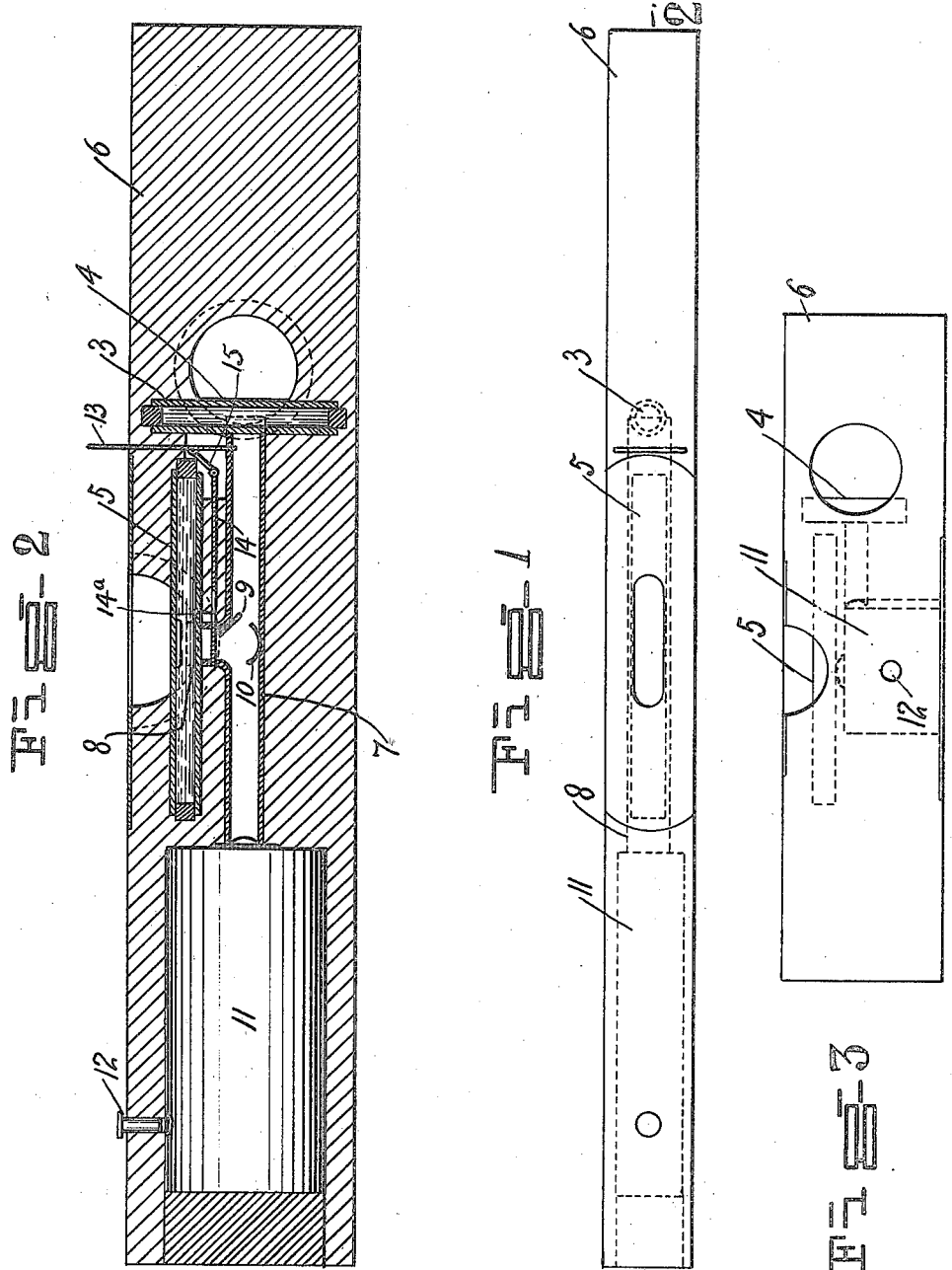

RAYMOND C. KELLOGG AND ANDREW JOHNSON, OF NEW YORK, N. Y.

LEVEL.

1,162,931.  Specification of Letters Patent.  Patented Dec. 7, 1915.

Application filed September 30, 1911. Serial No. 652,126.

*To all whom it may concern:*

Be it known that we, RAYMOND C. KELLOGG and ANDREW JOHNSON, citizens of the United States, residing at New York city, county and State of New York, have invented certain new and useful Improvements in Levels, of which the following is a specification, reference being had therein to the accompanying drawing.

Our invention relates to improvements in levels and has for its principal object the construction of a level, with illuminating means suitably arranged so that the level can be read in dark and obscure places.

In the accompanying drawings, Figure 1 is a side elevation of a level illustrating an application of our invention. Fig. 2 is a side elevation thereof. Fig. 3 is a side elevation of a modification.

3 is the glass tube containing the liquid to read on the vertical when the level is placed against a wall or the like, and 5 is a similar tube for reading on the horizontal. 6 is the usual block in which these tubes are preferably mounted.

7 is a central tube in a line with the center of the tube 3 and having a side outlet 8 in line with the center of the tube 5. This tube is preferably provided with reflectors 9 and 10 in about the position shown.

11 is a suitable light such as a pocket battery provided with the usual button 12 preferably set in the block 6 about as shown.

13 and 14 are shutters adapted to shut out the light when desired.

When using the level for the vertical it is placed against the wall in the usual manner and the shutter 14 is closed. The button 12 is then pressed and the light travels through the tube 7 upon the liquid of the tube 3, making a visible reading. In reading the horizontal, the shutter 13 is closed and the shutter 14 opened by the link connection 15 and the light then passes through the tube as before and through the shutter opening 14ª but the reflector 9 and the reflector 10 cause the light to be deflected at right angles through the side opening upon the liquid in the tube 5, thus illuminating the reading.

Of course it will be understood that any form of illuminating means may be employed and that the method of reflecting the rays may be varied without departing from the invention.

In the modification illustrated in Fig. 3 a battery provided with two lamps as shown may be employed. It is readily understood of course that such a battery has no essential differences from the one shown in Fig. 2 except that the two lights are connected and operated by a button such as 12 instead of one light as shown in Fig. 2. In such an arrangement the light can be made to cast its rays directly on the tube for both vertical and horizontal readings. In that case the level is preferably cut away to provide a pocket within which the battery may be placed as shown in the drawing.

Of course it will be understood that various other modifications may be made without departing from the spirit of the invention as set forth in the claims.

We claim:

1. A level containing a sight tube and having an internal chamber and an internal passage communicating therewith and opening upon the sight tube thereof, a button upon said level adapted to project into said internal chamber, a pocket electric light provided with a button switch fitting said chamber so as to direct its light through said passage upon said tube and so that the button thereof is immediately beneath said button upon said level whereby when said last mentioned button is pressed the light from said pocket electric light is flashed.

2. A level containing a sight tube and having an internal chamber and an internal passage communicating therewith and opening upon the sight tube thereof, a button upon said level adapted to project into said internal chamber, a pocket electric light provided with a button switch fitting said chamber so as to direct its light through said passage upon said tube and so that the button thereof is immediately beneath said button upon said level whereby when said last mentioned button is pressed the light from said pocket electric light is flashed, and a reflector within said passage to reflect said light therefrom.

3. A level containing a sight tube and having an internal chamber and an internal passage communicating therewith and opening upon the sight tube thereof, a button upon said level adapted to project into said internal chamber, a pocket electric light provided with a button switch fitting said chamber so as to direct its light through said passage upon said tube and so that the button thereof is immediately beneath said button upon said level whereby when said last mentioned button is pressed the light from said pocket electric light is flashed, and a shutter in combination with said passage to cut off the light therefrom.

In testimony whereof we affix our signatures in presence of two witnesses.

RAYMOND C. KELLOGG.
ANDREW JOHNSON.

Witnesses:
LOUISE ENDERLE,
THOMAS A. HILL.